UNITED STATES PATENT OFFICE.

HENRY W. MERRITT, OF SOMERVILLE, MASSACHUSETTS, ASSIGNOR TO HIMSELF, AND BAYAUD & STEVENS, OF NEW YORK, N. Y.

PLASTIC COMPOUND FOR WALLS.

SPECIFICATION forming part of Letters Patent No. 363,408, dated May 24, 1887.

Application filed August 7, 1886. Serial No. 210,300. (No specimens.)

*To all whom it may concern:*

Be it known that I, HENRY W. MERRITT, of Somerville, in the county of Middlesex and State of Massachusetts, have invented a new and useful Improvement in Plastic Compounds for Walls, &c., of which the following description is a specification.

This invention is an improvement upon certain inventions secured to me by Letters Patent of the United States, No. 322,307, dated July 14, 1885, and No. 341,157, dated May 4, 1886; and its object is to secure a more economic and better mode and means of making a plastic compound which, when exposed to the air, will set and become extremely hard.

In the practice of my two prior inventions, above referred to, I preferably employed as ingredients a highly silicious silicate of magnesia, called "asbestine," (of chemical character, as set forth in the specification of my above-named Letters Patent No. 322,307,) in a pulverized condition, quartz-sand, caustic soda or caustic potash, and soluble alkaline silicate or silicate of soda, mixed with water and dissolved to give plasticity to the mass.

I have now discovered that by dispensing with the caustic soda or caustic potash and substituting therefor carbonate of lime, preferably in the form of chalk or whiting, I produce a much better plastic compound than by the other methods, the adding of the carbonate of lime aforesaid causing the combination or compound to dry more rapidly and harden more thoroughly.

In order to make good plaster for walls, ceilings, &c., I take ten pounds (10 lbs.) of pulverized asbestine and four pounds (4 lbs.) of pulverized chalk or whiting. These ingredients I mix with from eighteen to twenty-two pounds (18 to 22 lbs.) of water, and add thirteen pounds (13 lbs.) of soluble alkaline silicate, (silicate of soda,) thus forming a mass of plastic compound that will fill a pail of ordinary size. With this I incorporate double its bulk, or about two pailfuls, of sand, which if dry would weigh from one hundred and ten to one hundred and fifteen pounds, (110 to 115 lbs.) This mass, when thoroughly intermixed, makes a plaster of proper consistency to apply with a trowel in the usual manner, and the plastic compound thus produced will gradually harden when exposed to the air, and finally become stone-like in its character.

I do not restrict myself to the exact proportions of the ingredients above given in the production of my improved compound, as these are not absolute, but may be more or less varied within practical limits, such variations depending somewhat upon the density of the soluble alkaline silicate used. I find, however, that the proportions as stated are correct to all intents and purposes.

The highly silicious silicate of magnesia and the soluble alkaline silicate, together with the chalk or whiting, (carbonate of lime,) are the essential constituents of the plastic compound herein described, since the resultant stone-like product is due to their chemical combination when combined with water to form the plastic compound, and sand is combined with them mainly for the purpose of economy in increasing the bulk of plastic material, wherein it is held and bound by the compound formed by the union of the active ingredients. Consequently the proportion of sand can be varied to suit the character of the work for which the compound is to be used.

The plastic compound, omitting the sand, and formed by the mixture of pulverized silicate of magnesia, pulverized carbonate of lime, water, and soluble silicate of soda, can be used either as a cement or as a paint.

I claim—

1. A plastic compound consisting of silica and a solid silicate and carbonate of lime, each in pulverized condition, dissolved in water, and a soluble alkaline silicate, the whole being intermixed and incorporated substantially in the manner and for the purposes set forth.

2. A plastic compound consisting of quartz-sand, pulverized silicate of magnesia, preferably asbestine and carbonate of lime, and a soluble alkaline silicate, with water to dissolve and give plasticity to the mass.

3. A mixture of pulverized solid silicate, carbonate of lime, and water, with a proportion of soluble alkaline silicate, ready for subsequent addition of sand to form a plastic compound, substantially as described.

4. A mixture of pulverized silicate of magnesia, carbonate of lime, and water, with a proportion of soluble silicate of soda, thus forming a plastic compound suitable for use either as a cement or a paint.

HENRY W. MERRITT.

Witnesses:
A. GREGORY,
EDW. M. CLARK.